US011616291B1

(12) United States Patent
Izadian

(10) Patent No.: US 11,616,291 B1
(45) Date of Patent: Mar. 28, 2023

(54) CORPORATE FEED OPEN ENDED WAVEGUIDE ANTENNA FOR AUTOMOTIVE RADAR

(71) Applicant: Waymo LLC, Mountain View, CA (US)

(72) Inventor: Jamal Izadian, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 867 days.

(21) Appl. No.: 16/219,316

(22) Filed: Dec. 13, 2018

(51) Int. Cl.
*H01Q 21/06* (2006.01)
*H01Q 1/32* (2006.01)
*G01S 7/03* (2006.01)
*H01Q 21/00* (2006.01)

(52) U.S. Cl.
CPC ......... *H01Q 1/3233* (2013.01); *G01S 7/032* (2013.01); *H01Q 21/0037* (2013.01); *H01Q 21/062* (2013.01)

(58) Field of Classification Search
CPC ............ H01Q 1/3233; H01Q 21/0037; H01Q 21/062; G01S 7/032
See application file for complete search history.

(56) References Cited

U.S. PATENT DOCUMENTS

| 2016/0047893 A1* | 2/2016 | Izadian | H04B 7/0617 342/175 |
| 2017/0222323 A1* | 8/2017 | Brown | H01Q 1/3233 |

\* cited by examiner

*Primary Examiner* — Dieu Hien T Duong
(74) *Attorney, Agent, or Firm* — McDonnell Boehnen Hulbert & Berghoff LLP

(57) ABSTRACT

Example radar systems are presented herein. A radar system may include an input layer having a feed waveguide and a first portion of a first waveguide section. The antenna system also includes a first dividing layer having a second portion of the first waveguide section and a first portion of a second waveguide section. The antenna system also includes a second dividing layer having a second portion of the second waveguide section and a first portion of a third waveguide section. Additionally, the antenna system includes an antenna layer having a plurality of radiating elements arranged in a linear array and a second portion of the third waveguide section. The antenna system further includes a path length from the feed waveguide to each radiating element is the same as the path length for each other radiating element.

20 Claims, 9 Drawing Sheets

CORPORATE FEED OPEN ENDED WAVEGUIDE ANTENNA FOR AUTOMOTIVE RADAR

BACKGROUND

Radio detection and ranging (RADAR) systems can be used to actively estimate distances to environmental features by emitting radio signals and detecting returning reflected signals. Distances to radio-reflective features can be determined according to the time delay between transmission and reception. A radar system can emit a signal that varies in frequency over time, such as a signal with a time-varying frequency ramp. The radar system can then relate the difference in frequency between the emitted signal and the reflected signal in order to derive a range estimate of the object or surface that reflected the emitted signal.

Some radar systems may also estimate relative motion of reflective objects based on Doppler frequency shifts in the received reflected signals. In addition, a radar system may incorporate directional antennas for the transmission and/or reception of signals in order to associate each range estimate with a bearing. The directional antennas can also be used to focus radiated energy on a given field of view of interest enabling the surrounding environment features to be mapped using the radar system.

SUMMARY

In one aspect, the present application describes an antenna system. The antenna system includes an input layer having a feed waveguide and a first portion of a first waveguide section. The antenna system also includes a first dividing layer having a second portion of the first waveguide section and a first portion of a second waveguide section. The antenna system additionally includes a second dividing layer having a second portion of the second waveguide section and a first portion of a third waveguide section. Additionally, the antenna system includes an antenna layer having a plurality of radiating elements arranged in a linear array and a second portion of the third waveguide section. The antenna system further includes a path length from the feed waveguide to each radiating element is the same as the path length for each other radiating element.

In another aspect, the present application describes a method. The method involves feeding electromagnetic energy to a feed waveguide, where the feed waveguide and a first portion of a first waveguide are located in a first layer. The method further involves dividing the electromagnetic energy from the feed waveguide between a first dividing terminal and a second dividing terminal, where the first and second dividing terminals and a second portion of the first waveguide are located in a second layer. The method also involves dividing the electromagnetic energy from the first dividing terminal between a first subsequent dividing terminal and a first combining terminal, where the first subsequent dividing terminal and the first combining terminal are located in a third layer. Additionally, the method involves dividing the electromagnetic energy from the second dividing terminal between a second subsequent dividing terminal and a second combining terminal, where the second subsequent dividing terminal and the second combining terminal are located in the third layer. Moreover, the method involves dividing the electromagnetic energy from the first subsequent dividing terminal between a first radiating element and a second radiating element, where the first and second radiating elements are located in a fourth layer. And, the method also involves dividing the electromagnetic energy from the second subsequent dividing terminal between a third radiating element and a fourth radiating element, where the third and fourth radiating elements are located in the fourth layer. Yet further, the method involves combining the electromagnetic energy from the first combining terminal and the second combining terminal and providing the combined electromagnetic energy to a fifth radiating element, where the fifth radiating element is located in the fourth layer.

In yet another aspect, the present application describes an antenna array. The antenna array includes a plurality radiating pathways, each pathway comprising a plurality of radiating elements. The antenna array also includes an input layer comprising a plurality of feed waveguides and a first portion of first waveguide sections. Additionally, the antenna array includes a first dividing layer comprising a second portion of the first waveguide sections and a first portion of second waveguide sections. Yet further, the antenna array includes a second dividing layer comprising a second portion of the second waveguide sections and a first portion of third waveguide sections. And, the antenna array also includes an antenna layer comprising the plurality of radiating elements in a two-dimensional array and a second portion of the third waveguide sections, where a path length from the feed waveguide to each radiating element is the same as the path length for each other radiating element.

In yet another aspect, the present application describes a method. The method involves feeding electromagnetic energy to a feed waveguide, where the feed waveguide and a first portion of a first waveguide are located in a first layer. The method also involves dividing the electromagnetic energy from the feed waveguide between a first dividing terminal and a second dividing terminal, where the first and second dividing terminals and a second portion of the first waveguide are located in a second layer. The method further involves dividing the electromagnetic energy from the first dividing terminal between a first subsequent dividing terminal and a fifth radiating element, wherein the first subsequent dividing terminal is located in a third layer and the fifth radiating element is located in a fourth layer. Additionally, the method involves dividing the electromagnetic energy from the second dividing terminal between a second subsequent dividing terminal and a sixth radiating element, wherein the second subsequent dividing terminal is located in the third layer and the sixth radiating element is located in a fourth layer. Moreover, the method involves dividing the electromagnetic energy from the first subsequent dividing terminal between a first radiating element and a second radiating element, where the first and second radiating elements are located in a fourth layer. The method also involves dividing the electromagnetic energy from the second subsequent dividing terminal between a third radiating element and a fourth radiating element, where the third and fourth radiating elements are located in the fourth layer. Yet further, the method involves combining the electromagnetic energy from the first combining terminal and the second combining terminal and providing the combined electromagnetic energy to a fifth radiating element, where the fifth radiating element is located in the fourth layer.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
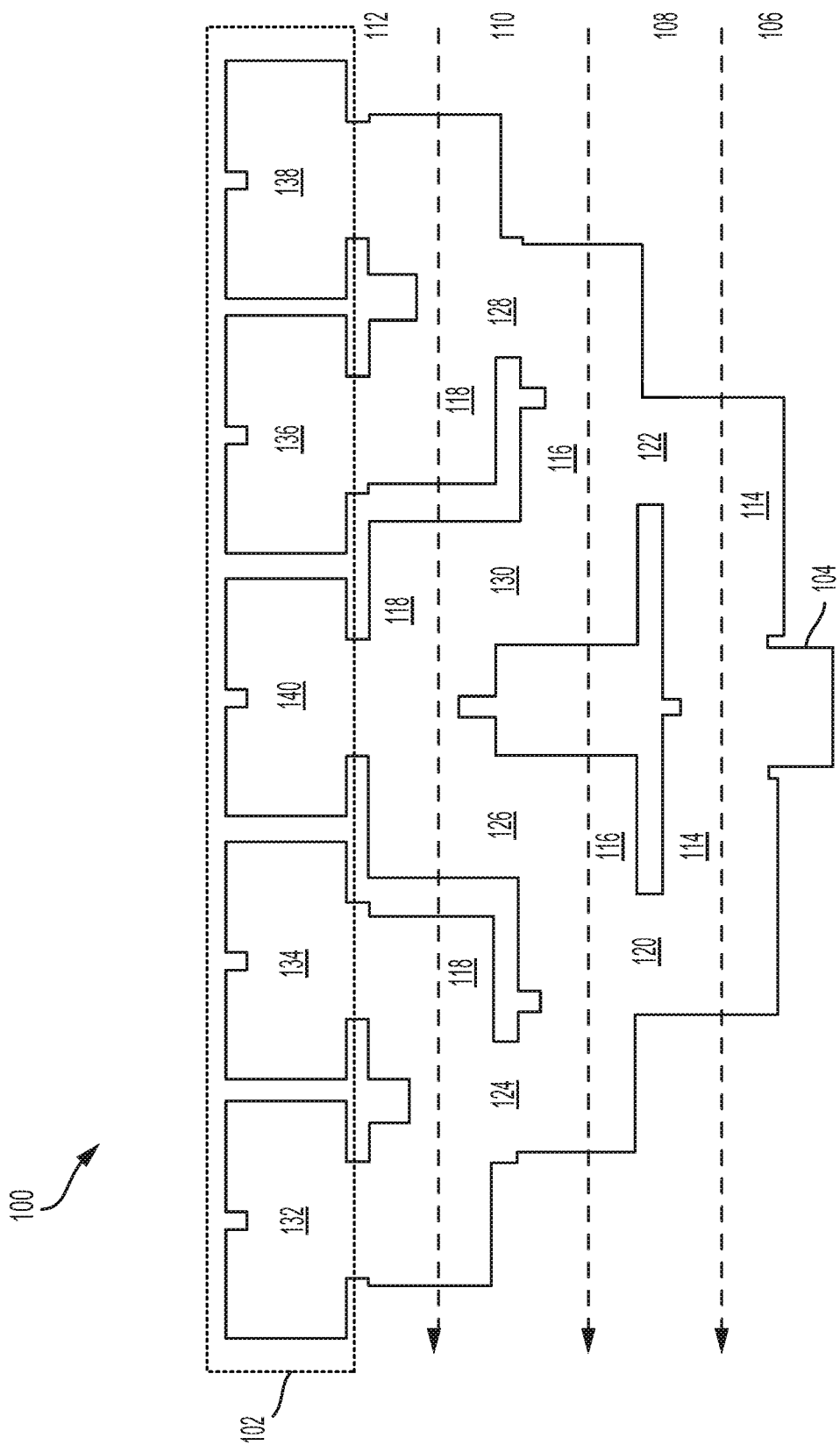
FIG. 1A illustrates a configuration of an antenna, in accordance with example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system may operate at an electromagnetic wave frequency in the W-Band, for example 77 Giga-Hertz (GHz), resulting in millimeter (mm) electromagnetic wave length (e.g., 3.9 mm for 77 GHz). The radar system may use one or more antennas to focus radiated energy into tight beams to measure a nearby environment with high accuracy. For instance, the radar system may capture measurements of the environment around an autonomous vehicle. Such antennas may be compact (as an example, an antenna may have a rectangular form factors; e.g., 1.3 inches high by 2.5 inches wide), efficient (i.e., there should be little energy lost to heat in the antenna, or reflected back into the transmitter electronics), and inexpensive and easy to manufacture.

Efficiency can be difficult to achieve in inexpensive, easy to manufacture radar systems. Particularly, some inexpensive and easy to manufacture options involve integrating the antenna onto a circuit board (e.g., with a "series-fed patch array"). This antenna configuration, however, might lose energy due to the substrate of the circuit board absorbing energy. To reduce energy loss, an antenna may be constructed using an all-metal design. Conventional all-metal antenna designs, such as slotted waveguide arrays, might be difficult to manufacture in a manner that incorporates the small geometries needed to enable 77 GHz operation.

The following detailed description discloses an apparatus for an "open-ended waveguide" (OEWG) antenna for a radar system. The detailed description also presents methods for fabricating such an antenna. The radar system may operate for an autonomous vehicle or another type of navigating entity. In some examples, the term "OEWG" may refer herein to a short section of a horizontal waveguide channel plus a vertical channel. In some examples, the vertical channel splits into two parts, where each of the two parts of the vertical channel includes an output port configured to radiate at least a portion of electromagnetic waves that enter the antenna. This may be a dual open-ended waveguide. In other examples, the vertical channel itself forms the output as a single element.

An example OEWG antenna may include two or more metal layers (e.g., aluminum plates) machined with computer numerical control (CNC), aligned properly, and joined together. The first metal layer may include a first half of an input waveguide channel. As such, the first half of the first waveguide channel may further include an input port that may be configured to receive electromagnetic waves (e.g., 77 GHz millimeter waves) into the first waveguide channel.

The first metal layer may also include a first half of a plurality of wave-dividing channels. The wave-dividing channels may include a network of channels that branch out from the input waveguide channel and configured to receive electromagnetic waves from the input waveguide channel, divide the electromagnetic waves into portions of electromagnetic waves (i.e., power dividers), and propagate the portions of electromagnetic waves to wave-radiating channels. As such, the metal layers may be called a split block construction.

The present antenna may include a plurality of metal layers. The metal layers form the antenna when the layers are coupled together. Where two metal layers are coupled together, the plane where the two metal layers come together may form a seam. As such, the plane of the seam may define the center of a waveguide that exists in part of one metal layer and a second metal layer. When the layers are couple together, the waveguide is formed. The waveguide of the present antenna may be an air-filled waveguide. Some layers may include waveguide sections configured to split and combine electromagnetic energy. The combination of multiple layers may form a beamforming network. Additionally, a top layer of antenna may include a plurality of radiating elements. The plurality of radiating elements may form a linear and/or a two dimensional array.

The antenna may further include a feed waveguide coupled on the opposite side of the antenna from the radiating elements. For instance, the radiating elements may be located on the top of the antenna and the feed waveguide may be located on the bottom of the antenna. During operation of the antenna in a transmission mode, the feed waveguide may provide electromagnetic energy to the antenna for transmission by the radiating elements. Conversely, during operation of the antenna in a reception mode, the feed waveguide may be configured to couple electromagnetic energy received from the radiating elements outside of the feed waveguide.

In some examples, the feed waveguide is located at a position that corresponds to a center position of the radiating elements. Unlike conventional waveguide systems where electromagnetic energy is fed at one of the ends of the length of the waveguide, feeding the antenna at a center position of the radiating elements causes the antenna to have symmetry. Particularly, a symmetric antenna as disclosed herein may have a path length from the feed waveguide to each radiating element that is the same length as each other path length. By having equal path lengths arranged symmetrically, the operation bandwidth of the antenna may be significantly increased compared to conventional antenna designs. Further, when the waveguide is positioned at a center location in the middle of the radiating elements, the waveguide may feed electromagnetic waves to the radiating elements in a common phase regardless of frequency. In turn, the antennas can be created to operate with a wider bandwidth of operation reducing potential phase issues.

Further, by feeding the waveguide from the bottom at a central position relative to the radiating elements, it may be easier to design the power splitting network for the antenna. As disclosed herein, the antenna can instead be fed from the bottom of the antenna block in a direction orthogonal to the direction of the length of the waveguides that feeds the radiating elements in some examples.

In some embodiments, the metal layers of an antenna may be joined directly, without the use of adhesives, dielectrics, or other materials, and without methods such as soldering, diffusion bonding, etc. that can be used to join two metal layers. For example, the metal layers may be joined by making the two layers in physical contact without any further means of coupling the layers.

In some examples, the present disclosure provides an integrated power divider and method by which each waveguide that feeds a plurality of radiating elements of a OEWG may have its associated amplitude is adjusted. The amplitude may be adjusted based on a predefined taper profile that specifies a relative phase and power for each respective radiating element. Additionally, the present OEWG may be implemented without complicated manufacturing process. For example, a CNC machining process or a metal-coated injection molding process may be implemented to make the above-described adjustments in parameters such as height, depth, multiplicity of step-up or step-down phase adjustment components, etc. Yet further, the present disclosure may enable a much more accurate method of synthesizing a desired amplitude and phase to cause a realized gain, side lobe levels, and beam steering for the antenna apparatus, as compared to other types of designs.

Furthermore, while in this particular example, the concept of electromagnetic waves (or portions/sub-portions thereof) propagating from one layer of an antenna to another layer is described for the purpose of illustrating functions of certain components of the antenna, such as the splitting and combining components. In reality, electromagnetic waves may not be confined to any particular "half" of a channel during certain points of their propagation through the antenna. Rather, at these certain points, the electromagnetic waves may propagate freely through both halves of a given channel when the halves are combined to form the given channel.

Referring now to the figures, FIG. 1A illustrates a first configuration of an antenna 100. As shown in the first configuration, the antenna 100 includes a set of radiating elements 102 arranged as radiating doublets and a feed waveguide 104. The antenna 100 may be constructed of multiple layers, such as an input layer 106, a first dividing layer 108, a second dividing layer 110, and an antenna layer 112. In other embodiments, the antenna 100 may include more or fewer layers in other arrangements.

As shown in FIG. 1A, the input layer 106 of the antenna 106 includes a feed waveguide 104 and a first portion of a first waveguide section 114. The first dividing layer 108 is coupled to the input layer 106 and includes a second portion of the first waveguide section 114 and a first portion of a second waveguide section 116. Coupled to the input layer 106, the second dividing layer 110 includes a second portion of the second waveguide section 116 and a first portion of a third waveguide section 118. Additionally, the antenna layer 112 of the antenna 100 includes a plurality of radiating elements 102 arranged in a linear array and a second portion of the third waveguide section 118. As such, in the configuration shown in FIG. 1A, a path length from the feed waveguide 104 to each radiating element of the radiating elements 102 is the same length as the path length for each other radiating element of the radiating elements 102. As previously discussed, when the waveguide is positioned at a center location in the middle of the radiating elements and the pathlength is the same for each radiating element, the waveguide may feed electromagnetic waves to the radiating elements in a common phase regardless of frequency. In other configurations, the antenna 100 may include more or fewer radiating elements than shown in FIG. 1A.

The set of radiating elements 102 are shown arranged in a linear array. Each radiating element is configured to radiate electromagnetic energy. For instance, the set of radiating elements 102 may receive a portion of the electromagnetic energy input into the antenna by the feed waveguide 104 and radiate the electromagnetic energy as radar signals into the environment. The portion of the antenna 100 between the feed waveguide 104 and the radiating components 102 may be referred to as a beamforming network. The beamforming network comprises the waveguides, power dividers, and power combiners.

The beamforming network is configured to guide electromagnetic energy between each of the set of radiating elements 102 and the feed waveguide 104. During operation of the antenna 100, the feed waveguide 104 is configured to transfer electromagnetic energy between the first waveguide 114 and a component external to the waveguide (e.g., a radar chipset that provides and receives radar signals in the form of electromagnetic energy). During the transmission of radar signals, the beamforming network is configured to divide and combine electromagnetic energy to provide each radiating element of the radiating elements 102 with electromagnetic energy. The dividing and combining may be based on a taper profile that specifies a relative phase and amplitude for each radiating element of the radiating elements 102. Conversely, during the reception of radar signals, the beamforming network is configured to divide and combine electromagnetic energy received by the radiating elements 102 and feed the received energy to the feed waveguide 104 where it can be received by a radar chip.

More specifically, a radar chip (not shown) feeds electromagnetic energy to a feed waveguide 104. As part of antenna 100, the feed waveguide 104 and a first portion of a first waveguide 114 are located in a first layer 106. A seam between the first layer 106 and the first dividing layer 108 may define a center portion of the first waveguide 114.

After the feed waveguide 104 receives electromagnetic energy, the first waveguide 114 may divide the electromagnetic energy from the feed waveguide 104 between a first dividing terminal 120 and a second dividing terminal 122. In the configuration of the antenna 100, the first diving terminal 120 and the second dividing terminal 122 and a second portion of the first waveguide 114 are shown located in the second layer 108.

The antenna 100 is also configured to divide the electromagnetic energy from the first dividing terminal 120 between a first subsequent dividing terminal 124 and a first combining terminal 126. In the antenna 100, the first subsequent dividing terminal 124 and the first combining terminal 126 are shown located in a third layer 110.

The antenna 100 is also configured to divide the electromagnetic energy from the second dividing terminal 122 between a second subsequent dividing terminal 128 and a second combining terminal 130. In the antenna 100, the second subsequent dividing terminal 128 and the second combining terminal 130 are shown located in the third layer 110.

The antenna 100 is also configured to divide the electromagnetic energy from the first subsequent dividing terminal 124 between a first radiating element 132 and a second radiating element 134. In the antenna 100, the first radiating element 132 and second radiating element 134 are shown located in a fourth layer 112.

The antenna 100 is also configured to divide the electromagnetic energy from the second subsequent dividing terminal 128 between a third radiating element 136 and a fourth radiating element 138. In antenna 100, the third radiating element 136 and fourth radiating element 138 are located in the fourth layer 112.

The antenna 100 is also configured to combine the electromagnetic energy from the first combining terminal 126 and the second combining terminal 128. The combined electromagnetic energy can be provided to a fifth radiating element 140, which is shown located in the fourth layer 112.

Figure 1B:
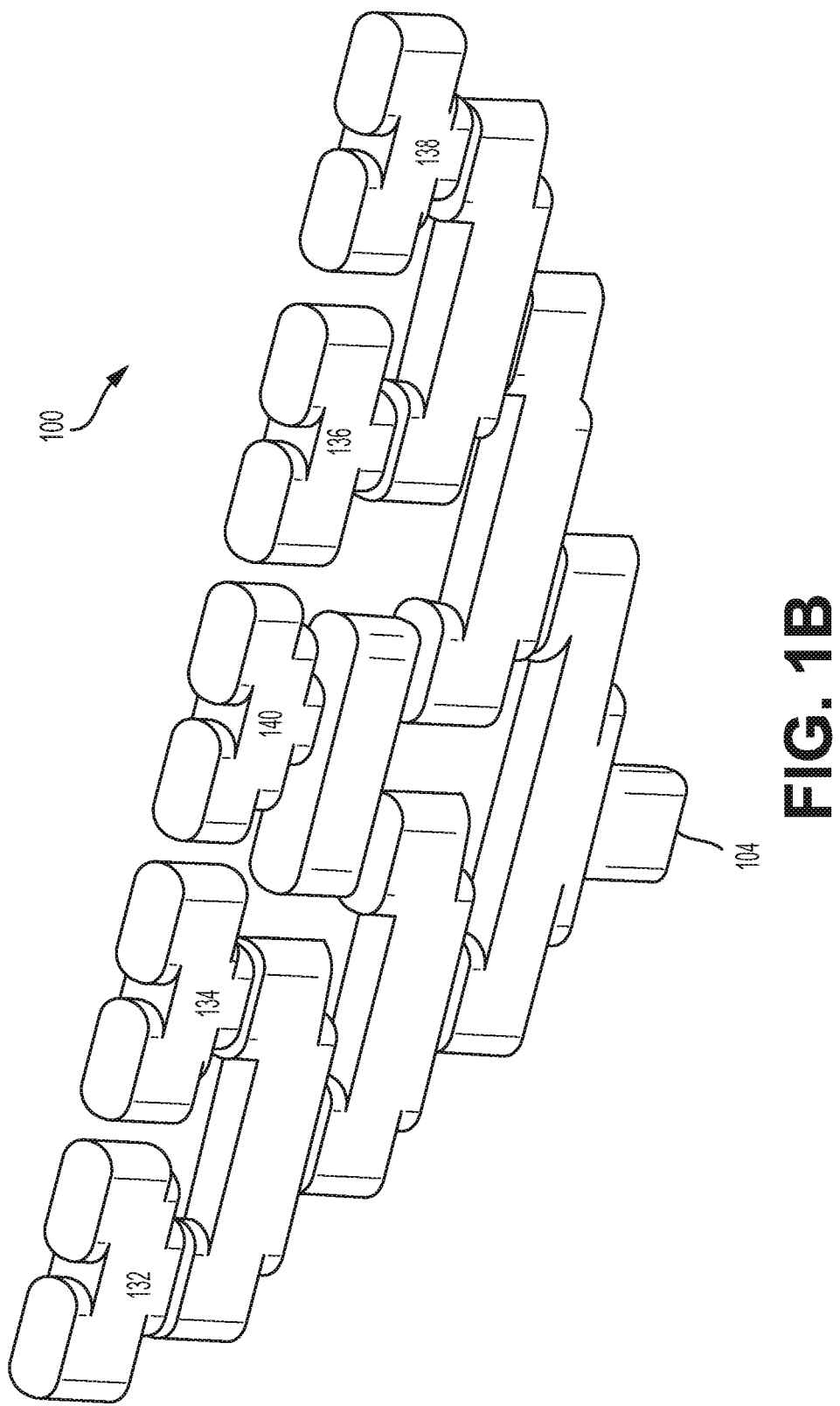
FIG. 1B illustrates another depiction of the antenna shown in FIG. 1A, in accordance with example embodiments.

FIG. 1B illustrates a three-dimensional rendering of a configuration of antenna 100 from FIG. 1A. The three-dimensional rendering of the antenna 100 shown including the set of radiating elements comprising radiating elements 132-140, a beamforming network (like that described with respect to FIG. 1), and the feed waveguide 104. In other configurations, the antenna 100 may include more or fewer radiating elements.

Figure 1C:
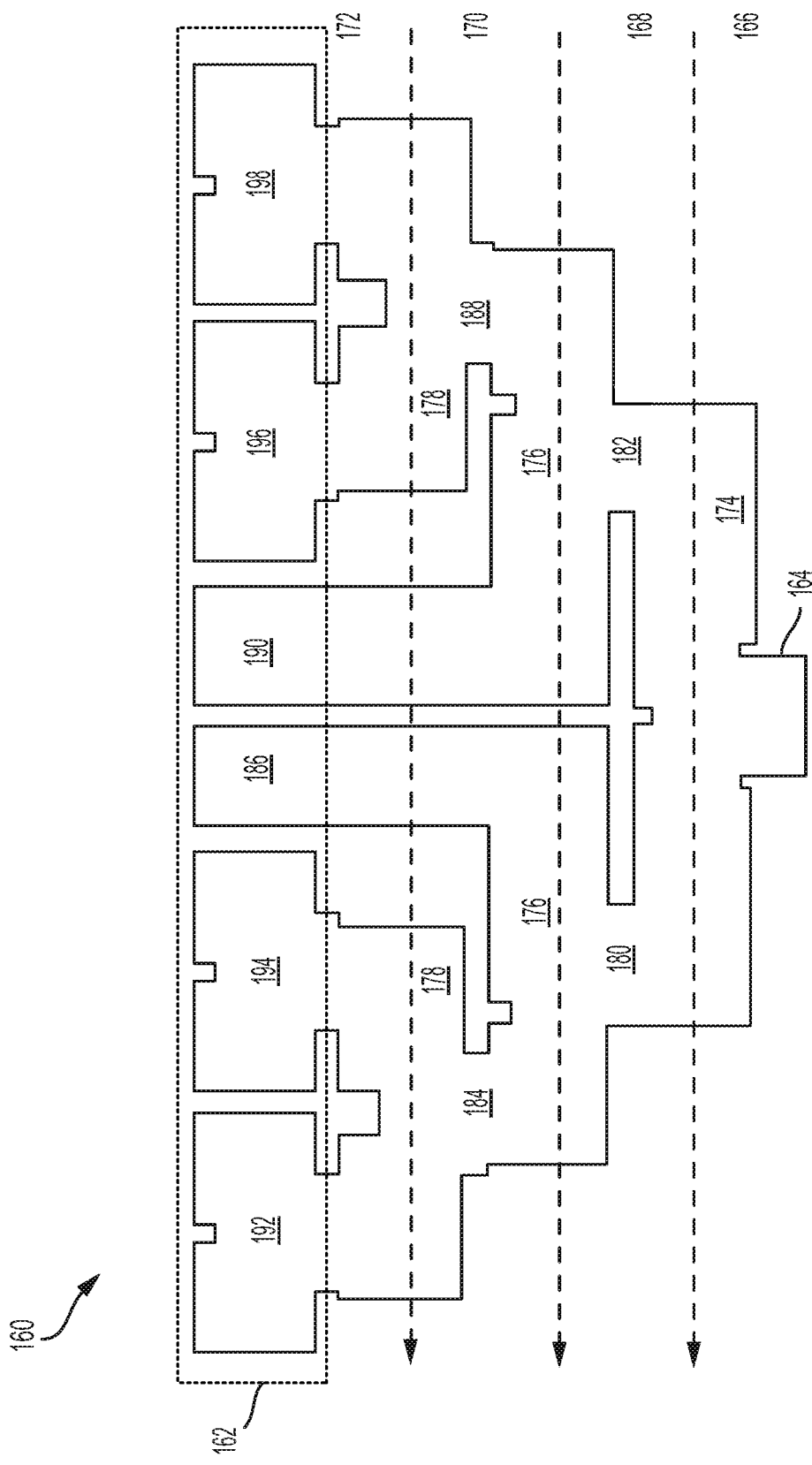
FIG. 1C illustrates a configuration of another antenna, in accordance with example embodiments.

FIG. 1C illustrates another configuration of an antenna 160. As shown in the configuration, the antenna 160 includes a set of radiating elements 162 and a feed waveguide 104. The radiating elements 162 are arranged as four radiating doublets 192, 194, 196, and 198, and two radiating singlets 186 and 190. Other possible antenna arrangements are possible as well. In one example, any antenna arrangement where the pathlength is the same between all the radiating elements and feed is specifically contemplated in the present disclosure.

Similar to antenna 100 of FIG. 1A, the antenna 160 may be constructed of multiple layers. The antenna 160 may include an input layer 166 comprising a feed waveguide 164 and a first portion of a first waveguide section 174. The antenna 160 also includes a first dividing layer 168 comprising a second portion of the first waveguide section 174 and a first portion of a second waveguide section 176. The antenna also includes a second dividing layer 180 comprising a second portion of the second waveguide section 176 and a first portion of a third waveguide section 178. Additionally, the antenna 160 includes an antenna layer 172 comprising a plurality of radiating elements 162 arranged in a linear array and a second portion of the third waveguide section 178. A path length from the feed waveguide 164 to each radiating element of the radiating elements 162 is the same as the path length for each other radiating element of the radiating elements 162. In other configurations, the antenna 160 may include more or fewer radiating elements than shown in FIG. 1C.

Similar to antenna 100 of FIG. 1A, the set of radiating elements 162 are shown with the radiating elements arranged in a linear array. Each radiating element is configured to radiate electromagnetic energy. For instance, the set of radiating elements 162 may receive a portion of the electromagnetic energy input into the antenna by the feed waveguide 164 and radiate the electromagnetic energy as radar signals into the environment. The portion of the antenna 160 between the feed waveguide 164 and the radiating components 162 may be referred to as a beamforming network. The beamforming network comprises the waveguides, power dividers, and power combiners.

The beamforming network is configured to guide electromagnetic energy between each of the set of radiating elements 162 and the feed waveguide 164. During operation of the antenna 160, the feed waveguide 164 is configured to transfer electromagnetic energy between the waveguide 164 and a component external to the waveguide (e.g., a radar chipset that provides and receives radar signals in the form of electromagnetic energy). During the transmission of radar signals, the beamforming network is configured to divide electromagnetic energy to provide each radiating element of the radiating elements 162 with electromagnetic energy. The division of electromagnetic energy may be based on a taper profile that specifies a relative phase and amplitude for each radiating element of the radiating elements 162. Conversely, during the reception of radar signals, the beamforming network is configured to combine electromagnetic energy received by the radiating elements 162 and feed the received energy to the feed waveguide 164 where it can be received by a radar chip.

In some embodiments, a radar chip (not shown) feeds electromagnetic energy to a feed waveguide 164. As part of the antenna 160, the feed waveguide 164 and a first portion of a first waveguide 174 are located in a first layer 166. A seam between the first layer 166 and the first dividing layer 168 may define a center portion of the first waveguide 174.

After the feed waveguide 164 receives electromagnetic energy, the first waveguide 174 may divide the electromagnetic energy from the feed waveguide 164 between a first dividing terminal 180 and a second dividing terminal 182. In the antenna 160, the first diving terminal 180 and the second dividing terminal 182 and a second portion of the first waveguide 174 are shown located in a second layer 168.

The antenna 160 is also configured to divide the electromagnetic energy from the first dividing terminal 180 between a first subsequent dividing terminal 184 and a fifth radiating element 186. In the antenna 160, the first subsequent dividing terminal 184 is located in a third layer 170 and the fifth radiating element 186 is located in a fourth layer 172. The fifth radiating element 186 may be fed by a waveguide portion that couples waveguide 176 to the fifth radiating element 186.

The antenna 160 is also configured to divide the electromagnetic energy from the second dividing terminal 182 between a second subsequent dividing terminal 188 and a sixth radiating element 190. In the antenna 160, the second subsequent dividing terminal 188 is located in the third layer 170 and the sixth radiating element 190 is located in the fourth layer 172. The sixth radiating element 190 may be fed by a waveguide portion that couples waveguide 176 to the sixth radiating element 190.

The antenna 160 is also configured to divide the electromagnetic energy from the first subsequent dividing terminal 184 between a first radiating element 192 and a second radiating element 194. In the antenna 160, the first radiating element 192 and second radiating element 194 are located in a fourth layer 172.

The antenna 160 is also configured to divide the electromagnetic energy from the second subsequent dividing terminal 188 between a third radiating element 196 and a fourth radiating element 198. In the antenna 160, the third radiating element 196 and fourth radiating element 198 are located in the fourth layer 172.

Figure 2A:
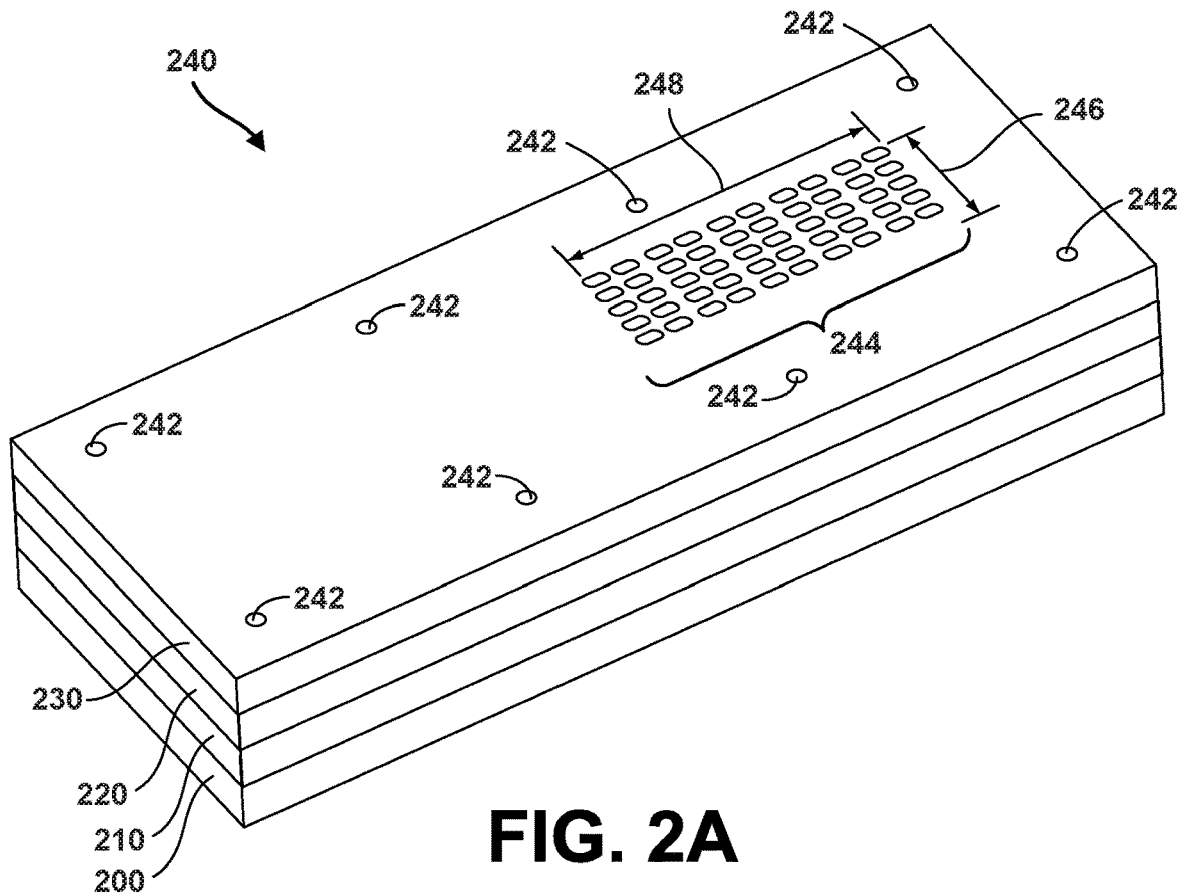
FIG. 2A illustrates an assembled view of an antenna, in accordance with example embodiments.

FIG. 2A illustrates a top-view of an assembled view of the antenna 240. The antenna 240 may include a first layer 200, a second layer 210, a third layer 220, and a fourth layer 230.

Each layer may include a plurality of holes 242 (through-holes and/or blind-holes) configured to house alignment pins, screws, and the like. The holes 242 may aid in aligning each layer with the other layers of the antenna 242. Additionally, in some examples, an antenna may be made with more or fewer than four layers. In some examples, the number of elements of an array of the antenna may dictate a number of layers in the antenna.

As shown in FIG. 2A, an OEWG array 244 may be a ten by four array. A ten by four array has ten radiating elements in on direction and four radiating elements in the other direction. In other examples, different size arrays may be used as well, for example, a ten by five array. Additionally, the OEWG array 244 of a given width 246 and a given length 248 which may vary based on the number of OEWGs and channels of the antenna 240. For instance, the OEWG array may have a width of about 11.43 mm and a length of about 28.24 mm. Further, in such an example embodiment, these dimensions, in addition to or alternative to other dimensions of the example antenna 240, may be machined with no less than about a 0.51 mm error, though in other embodiments, more or less of an error may be required. Other dimensions of the OEWG array are possible as well. Further, the radiating elements of OEWG array 244 are shown as having the same polarization in FIG. 2A. However, in some examples, the elements may have different polarizations, as explained further with respect to FIG. 2C.

In some embodiments, the four layers 200, 210, 220, 230 may be machined from aluminum plates (e.g., about 6.35 mm stock). In such embodiments, the first layer 200 may be at least 3 mm in thickness (e.g., about 5.84 mm to 6.86 mm). Further, the second, third, and fourth layers 210, 220, 230 may be machined from a 6.35 mm stock to a thickness of about 3.886 mm. Other thicknesses for layers are possible as well. Additionally, in some examples, each layer may be made through a metal-plated injection molding process. In this process, the layers may be made with plastic through injection molding and coated with metal (either fully metal covered or selectively metal covered). Injection-molding is discussed further with respect to FIG. 4.

In some embodiments, the joining of the layers may result in an air gap or other discontinuity between mating surfaces of the layers. In such embodiments, this gap or continuity should be proximate to (or perhaps as close as possible to) a center of the length of the antenna apparatus and may have a size of about 0.05 mm or smaller.

Figure 2B:
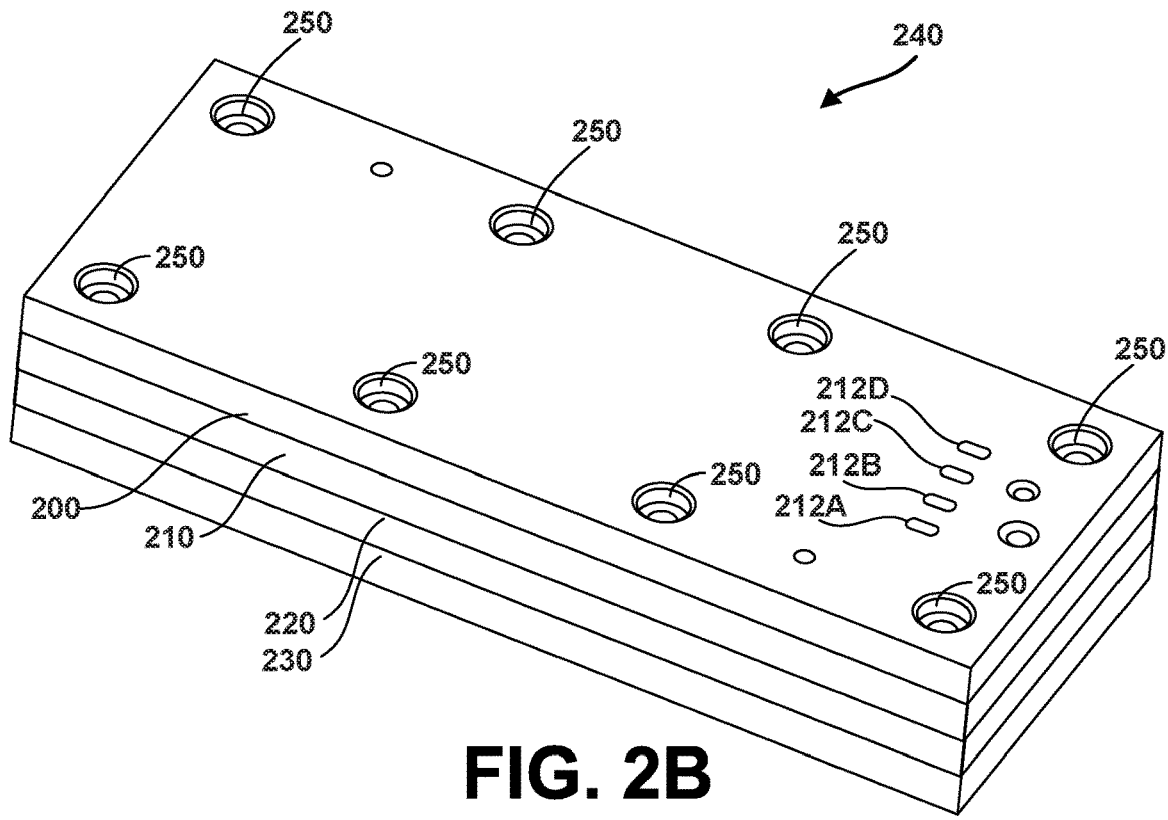
FIG. 2B illustrates another assembled view of the antenna, in accordance with example embodiments.

FIG. 2B illustrates a bottom-view of an assembled view of the antenna 240 from FIG. 2A. The antenna 240 may include a first layer 200, a second layer 210, a third layer 220, and a fourth layer 230. As shown, the first metal layer 200 may include a plurality of holes 250 (through-holes and/or blind-holes) configured to house alignment pins, screws, and the like. One or more of the plurality of holes 250 may be aligned with the holes 242 of the fourth metal layer 230.

Further, FIG. 2B shows four input ports 212A-D, where the antenna 240 may receive electromagnetic waves. Each input port may correspond to one linear array that forms OEWG array 244. For example, the two-dimensional OEWG array 244 may comprise four ten-element linear arrays. Each ten-element linear array may be fed by one of the four input ports 212A-D.

Figure 2C:
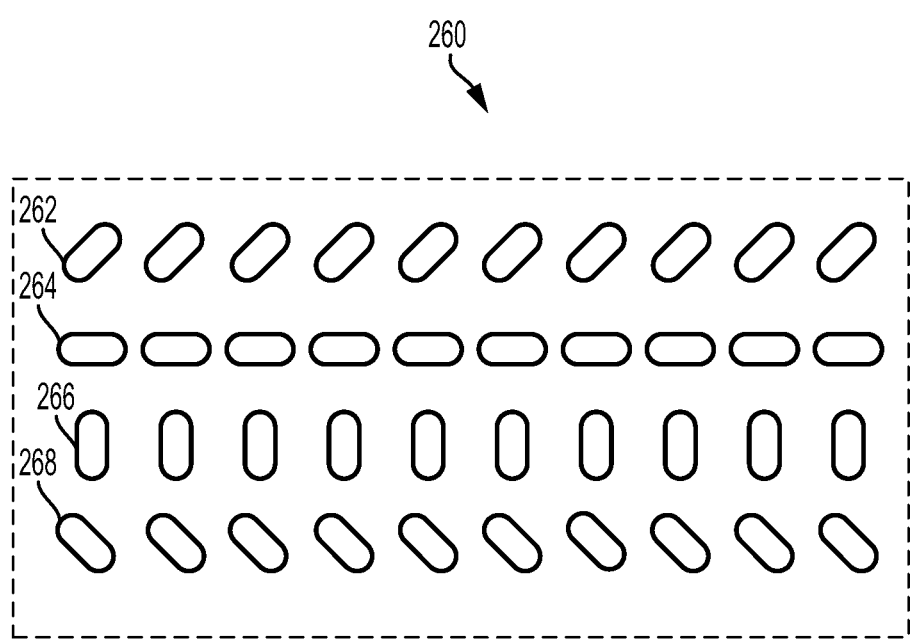
FIG. 2C illustrates an example array, in accordance with example embodiments.

FIG. 2C illustrates an example array 260, in accordance with example embodiments. The array 260 may be located on a top block, such as where array 244 is shown in FIG. 2A. As such, the array 260 may be configured to transmit and/or receive radar signals in four different polarizations. In some embodiments, array 260 may be a two dimensional array.

In one dimension, the array 260 may comprise four linear arrays 262, 264, 266, 268. Each of the linear arrays 262, 264, 266, 268 may include a number of radiating elements (e.g., ten radiating elements), each radiating element having a common polarization for each respective linear array. In the other dimension, the array 260 may include one radiating element from each of linear arrays 262, 264, 266, 268, where the phase center of each radiating element forms a line orthogonal to the phase-center line for each of linear arrays 262, 264, 266, 268.

Additionally, each linear array 262, 264, 266, 268, that makes up array 260 may correspond to its own respective input ports 212A-D, as shown in FIG. 2B. Therefore, the array may be able to selectively transmit or receive radar signals in one or more of four different polarizations by feeding radar signals into or receiving radar signals from one or more of the input ports 212A-D. As shown in FIG. 2C, a linear array 262 may be configured to operate with a +45 degree polarization, a linear array 264 may be configured to operate with a horizontal polarization, a linear array 266 may be configured to operate with a vertical polarization, and a linear array 268 may be configured to operate with a −45 degree polarization. The arrangement of the various arrays of array 260 is given as one example, in other embodiments, the location of each linear array in array 260 may be changed (e.g., the order of the polarizations may be different). Further, additional disclosure for a "Multiple Polarization Radar Unit" disclosed in U.S. patent application Ser. No. 15/848,205, filed Dec. 20, 2017 is hereby incorporated by reference in its entirety.

Figure 3:
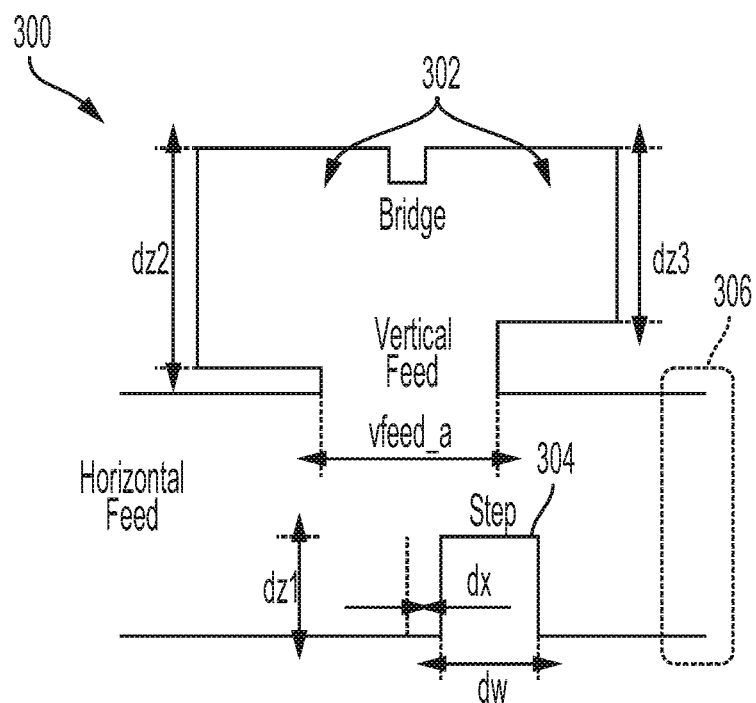
FIG. 3 illustrates a view of a radiating element, in accordance with example embodiments.

FIG. 3 illustrates a wave-radiating doublet of an antenna, in accordance with an example embodiment. More specifically, FIG. 3 illustrates a cross-section of one example DOEWG 300. As noted above, a DOEWG 300 may include a horizontal feed (i.e., channel), a vertical feed (i.e. a doublet neck), and a wave-directing member 304. The vertical feed may configured to couple energy from the horizontal feed to two output ports 302, each of which is configured to radiate at least a portion of electromagnetic waves out of the DOEWG 300. The horizontal feed may be a waveguide section, such as the examples shown in FIGS. 1A, 1B, and 1C. Each DOEWG may include a backstop at location 306, depending on the respective DOEWG, the backstop 306 may be on the left or right side. For example, as shown in FIG. 1A, element 132 may have backstop 306 on the left side whereas element 134 may have the backstop 306 on the right side. FIG. 3 further shows various parameters that may be adjusted to tune the amplitude and/or phase of an electromagnetic signal that couples into the radiating element.

In order to tune a DOEWG (e.g., DOEWG 300), the vertical feed width, vfeed_a, and various dimensions of the step 304 (e.g., dw, dx, and dz1) may be tuned to achieve different fractions of radiated energy out the DOEWG 300. The step 304 may also be referred to as a reflecting component as it reflects a portion of the electromagnetic waves that propagate down the horizontal feed into the vertical feed. Further, in some examples, the height dz1 of the reflecting component may be negative, that is may extend below the bottom of the horizontal feed. Similar tuning mechanisms may be used to tune the offset feed as well. For example, the offset feed may include any of the vertical feed width, vfeed_a, and various dimensions of the step (e.g., dw, dx, and dz1) as discussed with respect to the radiating element.

In some examples, each output port 302 of the DOEWG 300 may have an associated phase and amplitude. In order to achieve the desired phase and amplitude for each output port 302, various geometry components may be adjusted. As previously discussed, the step (reflecting component) 304 may direct a portion of the electromagnetic wave through the vertical feed. In order to adjust an amplitude associated with each output port 302 of a respective DOEWG 300, a height associated with each output port 302 may be adjusted. Further, the height associated with each output port 302 could be the height or the depths of this feed section of output port 302, and not only could be a height or depth adjustment but it could be a multiplicity of these changes or steps or ascending or descending heights or depths in general.

As shown in FIG. 3, height dz2 and height dz3 may be adjusted to control the amplitude with respect to the two output ports 302. The adjustments to height dz2 and height dz3 may alter the physical dimensions of the doublet neck (e.g. vertical feed of FIG. 3). The doublet neck may have dimensions based on the height dz2 and height dz3. Thus, as the height dz2 and height dz3 are altered for various doublets, the dimensions of the doublet neck (i.e. the height of at least one side of the doublet neck) may change. In one example, because height dz2 is greater than height dz3, the output port 302 associated with (i.e. located adjacent to) height dz2 may radiate with a greater amplitude than the amplitude of the signal radiated by the output port 302 associated with height dz3.

Further, in order to adjust the phase associated with each output port 302, steps may be introduced for each output port 302. The steps may be located on the flat sides of the output port 302 and adjust the height of dz2 and dz3 in a stepped manner. The steps in the height may cause a phase of a signal radiated by the output port 302 associated with the step to change. Thus, by controlling both the height and the steps associated with each output port 302, both the amplitude and the phase of a signal transmitted by the output port 302 may be controlled. In various examples, the steps may take various forms, such as a combination of up-steps and down-steps. Additionally, the number of steps may be increased or decreased to control the phase.

The above-mentioned adjustments to the geometry may also be used to adjust a geometry of the offset feed where it connects to the waveguide. For example, heights, widths, and steps may be adjusted or added to the offset feed in order to adjust the radiation properties of the system. An impedance match, phase control, and/or amplitude control may be implemented by adjusting the geometry of the offset feed.

Figure 4:
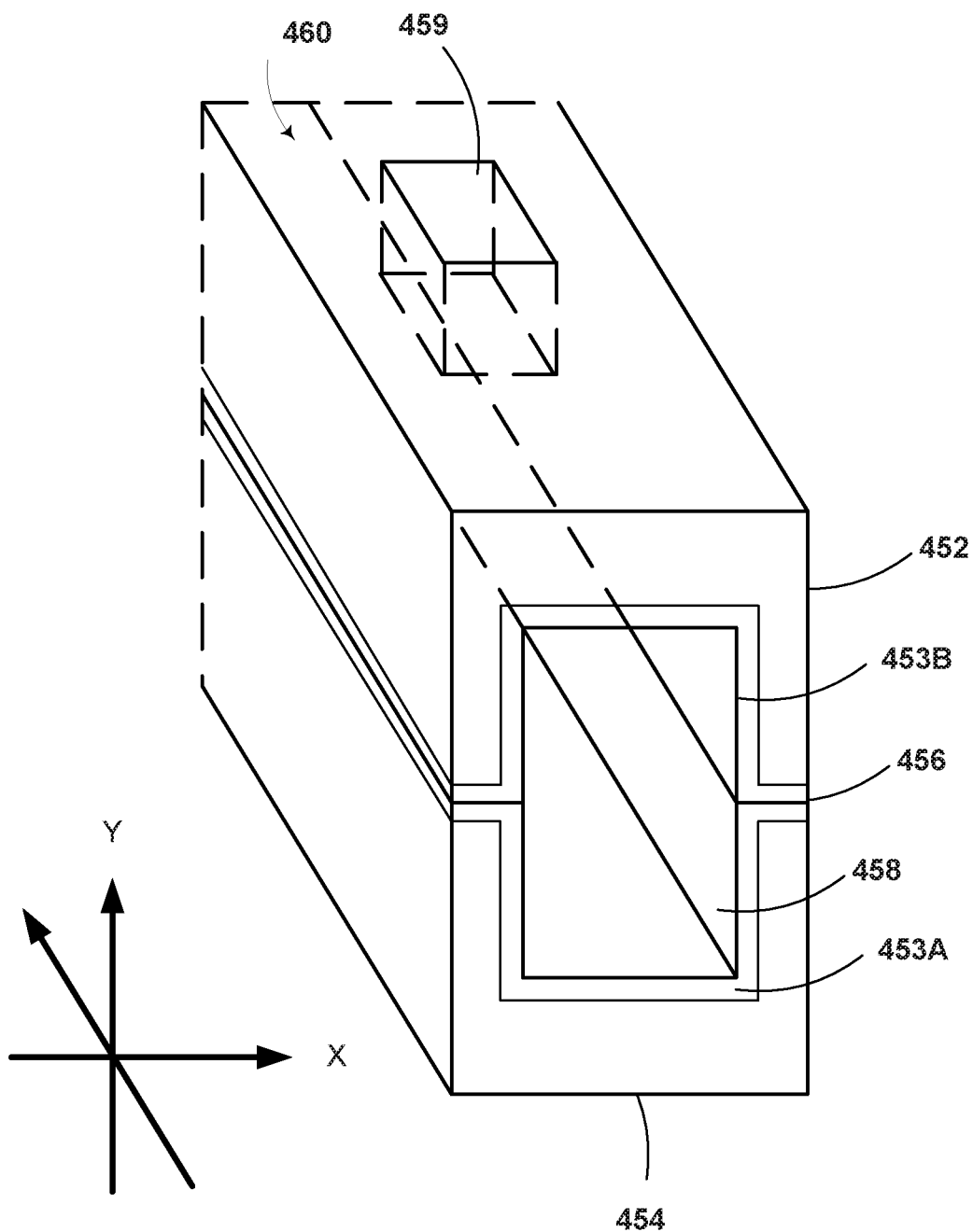
FIG. 4 illustrates another view of the radiating element, in accordance with example embodiments.

As previously discussed, in some examples, the present antenna may be constructed from a metal-plated polymer structure. The polymer may be formed through an injection molding process and coated with metal to provide the desired electromagnetic properties. FIG. 4 illustrates an example isometric cross-section view of a polymer-based waveguide 460 having a metallic portion 453A, 453B that may form the antenna described herein. The example waveguide 460 is formed with a top portion 452 and a bottom portion 454. The top portion 452 and a bottom portion 454 are coupled at seam 456. The seam 456 corresponds to a position where two layers couple together. The waveguide includes an air-filled cavity 458. Within cavity 458, electromagnetic energy propagates during the operation of waveguide 460. The waveguide 460 may also include a feed 459. Feed 459 can be used to provide electromagnetic energy to cavity 458 in waveguide 460. Alternatively or additionally, feed 459 may be used to allow electromagnetic energy to leave waveguide 450. The feed 459 may be a location where electromagnetic energy is fed into or removed from the present antenna. In other examples, the feed 459 may be a location where a waveguide receives energy from a different waveguide section of the antenna, such as the splitting or combining ports described with respect to FIGS. 1A and 1C. The example waveguide 460 of FIG. 4 features seam 456 at the middle point of the height of cavity 458. In various embodiments, the top portion 452 and a bottom portion 454 may be coupled together at various different positions along an axis of the waveguide.

As shown in FIG. 4, the top portion 452 and the bottom portion 454 may have a respective metallic portion 453A, 453B. The metallic portion 453A of the bottom portion 454 and the metallic portion 453B of the top portion 452 may each be formed through a plating process. As previously discussed, both the top portion 452 and the bottom portion 454 may be made of a polymer. The respective metallic portions 453A, 453B may be plated onto the RF surfaces, such as the internal portion of cavity 458 and the port 459. Thus, when the top portion 452 is brought into contact with the bottom portion 454, there is an electrical coupling of the respective metal portions. In the example shown in FIG. 4, only the RF surfaces (i.e., the surfaces in which electromagnetic energy come in contact) are plated. In other examples, additional surfaces beyond just the RF surfaces may be plated as well. Further, additional disclosure for a "Plated, Injection Molded, Automotive Radar Waveguide Antenna" disclosed in U.S. patent application Ser. No. 15/219,423, filed Jul. 26, 2016 is hereby incorporated by reference in its entirety.

Figure 5:
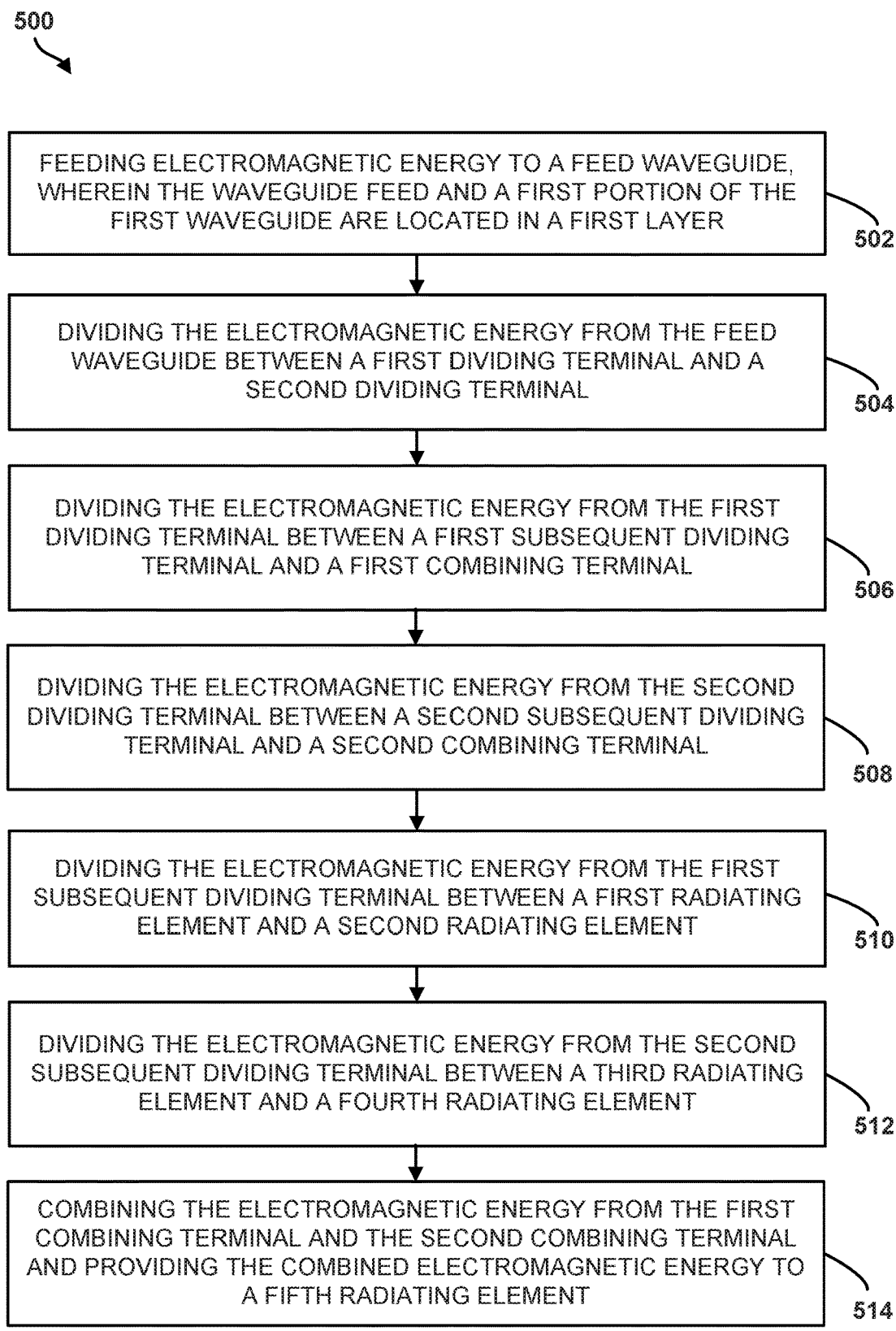
FIG. 5 is a flowchart of a method, in accordance with example embodiments.

FIG. 5 is a flowchart of an example method 500 to radiate electromagnetic energy. It should be understood that other methods of operation not described herein are possible as well.

It should also be understood that a given application of such an antenna may determine appropriate dimensions and sizes for various machined portions of the two metal layers described above (e.g., channel size, metal layer thickness, etc.) and/or for other machined (or non-machined) portions/components of the antenna described herein. For instance, as discussed above, some example radar systems may be configured to operate with W-band electromagnetic wave frequency of 77 GHz, which corresponds to millimeter electromagnetic wave length. At this frequency, the channels, ports, etc. of an apparatus fabricated by way of method 400 may be of given dimensions appropriated for the 77 GHz frequency. Other example antennas and antenna applications are possible as well.

Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 502, the method 500 includes feeding electromagnetic energy to a feed waveguide, wherein the feed waveguide and a first portion of a first waveguide are located in a first layer. In some examples, feeding electromagnetic energy to a first waveguide by a feed waveguide involves feeding the center of the first waveguide. As previously discussed, by feeding electromagnetic energy at the center of the first waveguide, the entire antenna may be symmetrical about a plane defined by the center of the feed waveguide and a center of the set of radiating elements. Additionally, during the operation of the antenna, electromagnetic energy fed into or received by the antenna propagates through an air-filled waveguide system.

At block 504, the method 500 includes dividing the electromagnetic energy from the feed waveguide between a first dividing terminal and a second dividing terminal, wherein the first and second dividing terminals and a second portion of the first waveguide are located in a second layer. At block 506, the method 500 includes dividing the electromagnetic energy from the first dividing terminal between a first subsequent dividing terminal and a first combining terminal, wherein the first subsequent dividing terminal and the first combining terminal are located in a third layer. At block 508, the method 500 includes dividing the electromagnetic energy from the second dividing terminal between a second subsequent dividing terminal and a second combining terminal, wherein the second subsequent dividing terminal and the second combining terminal are located in the third layer. As previously discussed, the electromagnetic energy may be split based on a predefined taper profile that specifies relative phasing as amplitudes for the various radiating components. Further, due to the symmetric design of the antenna, the splitting may be performed in a symmetrical manner as well.

At block 510, the method 500 includes dividing the electromagnetic energy from the first subsequent dividing terminal between a first radiating element and a second radiating element, wherein the first and second radiating elements are located in a fourth layer. At block 512, the method 500 includes dividing the electromagnetic energy from the second subsequent dividing terminal between a third radiating element and a fourth radiating element, wherein the third and fourth radiating elements are located in the fourth layer. Due to the symmetric nature of the antenna, the first and third radiating elements receive electromagnetic energy with the same relative amplitude and phase as each other. Additionally, the second and fourth radiating elements receive electromagnetic energy with the same relative amplitude and phase as each other.

At block 514, the method 500 includes combining the electromagnetic energy from the first combining terminal and the second combining terminal and providing the combined electromagnetic energy to a fifth radiating element, wherein the fifth radiating element is located in the fourth layer. In some examples of the method, block 514 may also include dividing electromagnetic energy received by the radiating elements between two open ended waveguide antennas. Further, block 514 may also include radiating the electromagnetic energy received by each open ended waveguide antenna. Additionally, a path length from the feed waveguide to each radiating element over which electromagnetic energy propagates during the operation of the method is the same as the path length for each other radiating element.

Figure 6:
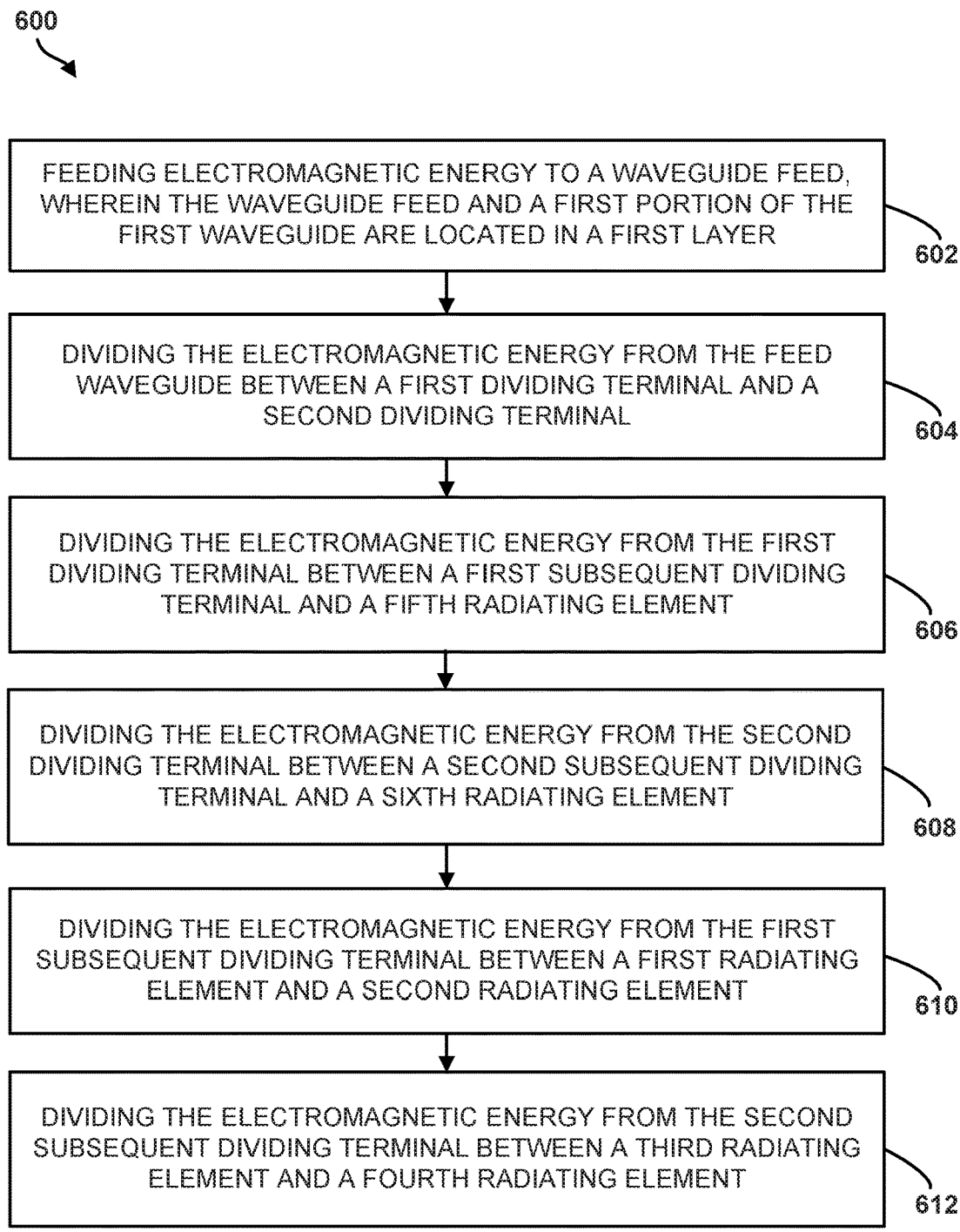
FIG. 6 is a flowchart of another method, in accordance with example embodiments.

FIG. 6 is a flowchart of an example method 600 to radiate electromagnetic energy. It should be understood that other methods of operation not described herein are possible as well.

At block 602, the method 600 includes feeding electromagnetic energy to a feed waveguide, wherein the feed waveguide and a first portion of a first waveguide are located in a first layer. In some examples, feeding electromagnetic energy to a first waveguide by a feed waveguide comprises feeding the center of the first waveguide. As previously discussed, by feeding electromagnetic energy at the center of the first waveguide, the entire antenna may be symmetrical about a plane defined by the center of the feed waveguide and a center of the set of radiating elements. Additionally, during the operation of the antenna, electromagnetic energy fed into or received by the antenna propagates through an air-filled waveguide system.

At block 604, the method 600 includes dividing the electromagnetic energy from the feed waveguide between a first dividing terminal and a second dividing terminal, wherein the first and second dividing terminals and a second portion of the first waveguide are located in a second layer. At block 606, the method 600 includes dividing the electromagnetic energy from the first dividing terminal between a first subsequent dividing terminal and a fifth radiating element, wherein the first subsequent dividing terminal is located in a third layer and the fifth radiating element is located in a fourth layer. At block 608, the method 600 includes dividing the electromagnetic energy from the second dividing terminal between a second subsequent dividing terminal and a sixth radiating element, wherein the second subsequent dividing terminal is located in the third layer and the sixth radiating element is located in the fourth layer. As previously discussed, the electromagnetic energy may be split based on a predefined taper profile that specifies relative phasing as amplitudes for the various radiating components. Further, due to the symmetric design of the antenna, the splitting may be performed in a symmetrical manner as well.

At block 610, the method 600 includes dividing the electromagnetic energy from the first subsequent dividing terminal between a first radiating element and a second radiating element, wherein the first and second radiating elements are located in the fourth layer. At block 612, the method 600 includes dividing the electromagnetic energy from the second subsequent dividing terminal between a third radiating element and a fourth radiating element, wherein the third and fourth radiating elements are located in the fourth layer. Due to the symmetric nature of the antenna, the first and third radiating elements receive electromagnetic energy with the same relative amplitude and phase as each other. Additionally, the second and fourth radiating elements receive electromagnetic energy with the same relative amplitude and phase as each other. In some examples of the method, block 614 may also include dividing electromagnetic energy received by the radiating elements between two open ended waveguide antennas for the first, second, third, and fourth radiating elements. Further, block 614 may also include radiating the electromagnetic energy received by each open ended waveguide antenna. Additionally, a path length from the feed waveguide to each radiating element over which electromagnetic energy propagates during the operation of the method is the same as the path length for each other radiating element.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. An antenna system comprising:
   an input layer comprising a feed waveguide and a first portion of a first waveguide section;
   a first dividing layer comprising a second portion of the first waveguide section and a first portion of a second waveguide section;
   a second dividing layer comprising a second portion of the second waveguide section and a first portion of a third waveguide section, wherein the second dividing layer includes two dividing terminals and two combining terminals; and
   an antenna layer comprising a plurality of radiating elements arranged in a linear array and a second portion of the third waveguide section, wherein a path length from the feed waveguide to each radiating element is the same as the path length to each other radiating element.

2. The antenna system of claim 1, wherein the first dividing layer includes two dividing terminals.

3. The antenna system of claim 1, wherein the antenna layer is configured to combine electromagnetic energy from the two dividing terminals of the second dividing layer.

4. The antenna system of claim 1, wherein the antenna layer comprises five radiating doublets.

5. The antenna system of claim 1, wherein the system is symmetric about a plane defined by a center of the feed.

6. The antenna system of claim 1, wherein the system symmetrically divides power.

7. The antenna system of claim 1, wherein the plurality of radiating elements are arranged in a linear array.

8. The antenna system of claim 1, wherein each layer is made from machined metal and each waveguide is air filled.

9. The antenna system of claim 1, wherein the first dividing layer is coupled to the input layer.

10. The antenna system of claim 1, wherein the second dividing layer is coupled to the input layer.

11. An antenna array comprising:
    a plurality radiating pathways, each pathway comprising a plurality of radiating elements;
    an input layer comprising a plurality of feed waveguides and a first portion of first waveguide sections;
    a first dividing layer comprising a second portion of the first waveguide sections and a first portion of second waveguide sections;
    a second dividing layer comprising a second portion of the second waveguide sections and a first portion of third waveguide sections, wherein the second dividing layer includes two dividing terminals and two combining terminals; and
    an antenna layer comprising the plurality of radiating elements in a two-dimensional array and a second portion of the third waveguide sections, wherein a path length from the feed waveguide to each radiating element is the same as the path length to each other radiating element.

12. The antenna array of claim 11, wherein the plurality of radiating pathways comprises four pathways, and wherein each radiating pathway corresponds to one of four transmitted polarizations, and wherein the four transmitted polarizations are horizontal, vertical, +45 degrees, and −45 degrees.

13. The antenna array of claim 11, wherein the two dimensional array comprises a five by ten array.

14. The antenna array of claim 11, wherein the antenna layer comprises five radiating doublets.

15. The antenna array of claim 11, wherein the system is symmetric about a plane defined by a center of the feed.

16. The antenna array of claim 11, wherein the system symmetrically divides power.

17. The antenna array of claim 11, wherein each layer is made from machined metal and each waveguide is air filled.

18. The antenna array of claim 11, wherein the first dividing layer is coupled to the input layer.

19. The antenna array of claim 11, wherein the second dividing layer is coupled to the input layer.

20. A method of radiating radar signals with an antenna system, comprising:
    feeding electromagnetic energy to a feed waveguide, wherein the feed waveguide and a first portion of a first waveguide section are located in an input layer;
    dividing the electromagnetic energy from the feed waveguide between a first dividing terminal and a second dividing terminal, wherein the first and second dividing terminals, a second portion of the first waveguide section, and a first portion of a second waveguide section, are located in a first dividing layer;
    dividing the electromagnetic energy from (i) the first dividing terminal between a subsequent first dividing terminal and a first combining terminal, and (ii) the second dividing terminal between a subsequent second dividing terminal and a second combining terminal, wherein a second portion of the second waveguide section, and a first portion of a third waveguide section are located in a second dividing layer;
    dividing the electromagnetic energy from (i) the subsequent first dividing terminal to first and second radiating elements of a plurality of radiating elements, and (ii) the subsequent second dividing terminal to third and fourth radiating elements of the plurality of radiating elements, wherein a second portion of the third waveguide section is located in an antenna layer comprising the plurality of radiating elements arranged in a linear array;
    combining the electromagnetic energy from the first and second combining terminals in the antenna layer; and
    providing the electromagnetic energy to a fifth radiating element of the plurality of radiating elements, and wherein a path length from the feed waveguide to each radiating element is the same as the path length to each other radiating element of the plurality of radiating elements.

* * * * *